(12) United States Patent
Jacob et al.

(10) Patent No.: US 7,909,194 B2
(45) Date of Patent: Mar. 22, 2011

(54) THERMOPLASTIC VULCANIZATES AND SEALING DEVICES MADE THEREWITH

(75) Inventors: Sunny Jacob, Akron, OH (US); Marvin C. Hill, Kingwood, TX (US); Purushottam Das Agrawal, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 577 days.

(21) Appl. No.: 11/173,033

(22) Filed: Jul. 1, 2005

(65) Prior Publication Data

US 2007/0000926 A1    Jan. 4, 2007

(51) Int. Cl.
*B65D 53/00*      (2006.01)
*C08F 8/00*       (2006.01)
*C09J 4/00*       (2006.01)
*C09J 101/00*     (2006.01)
*C09J 201/00*     (2006.01)

(52) U.S. Cl. .................. 220/233; 525/129; 523/176
(58) Field of Classification Search .................. 220/233; 523/176; 525/129
See application file for complete search history.

(56) References Cited

U.S. PATENT DOCUMENTS

| | | |
|---|---|---|
| 2,356,128 A | 8/1944 | Thomas et al. |
| 2,714,605 A | 8/1955 | Jones |
| 2,764,563 A | 9/1956 | McMaster et al. |
| 2,944,576 A | 7/1960 | Acosta |
| 2,972,600 A | 2/1961 | Braidwood |
| 3,072,618 A | 1/1963 | Turbak |
| 3,094,144 A | 6/1963 | Oxley et al. |
| 3,097,194 A | 7/1963 | Leonard, Jr. et al. |
| 3,205,285 A | 9/1965 | Turbak et al. |
| 3,255,130 A | 6/1966 | Keim et al. |
| 3,264,272 A | 8/1966 | Rees |
| 3,287,440 A | 11/1966 | Giller |
| 3,322,734 A | 5/1967 | Rees |
| 3,338,734 A | 8/1967 | Goff et al. |
| 3,355,319 A | 11/1967 | Rees |
| 3,522,222 A | 7/1970 | Taylor |
| 3,522,223 A | 7/1970 | Taylor |
| 3,939,242 A | 2/1976 | Lundberg et al. |
| 4,102,850 A * | 7/1978 | Cooper et al. ................. 524/141 |
| 4,311,628 A * | 1/1982 | Abdou-Sabet et al. ....... 524/447 |
| 4,594,390 A | 6/1986 | Abdou-Sabet et al. |
| 4,810,752 A | 3/1989 | Bayan |
| 4,883,837 A * | 11/1989 | Zabrocki ......................... 525/66 |
| 4,916,180 A | 4/1990 | Robinson et al. |
| 4,978,714 A | 12/1990 | Bayan et al. |
| 5,013,793 A | 5/1991 | Wang et al. |

(Continued)

FOREIGN PATENT DOCUMENTS

EP          0 362 472          4/1990

(Continued)

OTHER PUBLICATIONS

Webb et al. ,Butyl Rubber, Encyclopedia of Polymer Science and Technology, John Wiley and Sons, 2003.*

(Continued)

*Primary Examiner* — Mark Eashoo
*Assistant Examiner* — Liam J Heincer (57) ABSTRACT

An article for sealing the contents of a container, the article comprising a member adapted for sealing the container, where the member includes a thermoplastic vulcanizate including a dynamically cured butyl rubber, a thermoplastic polyurethane having a glass transition temperature of less than about 60° C., and a synthetic oil.

12 Claims, 1 Drawing Sheet

U.S. PATENT DOCUMENTS

| | | |
|---|---|---|
| 5,021,500 A | 6/1991 | Puydak et al. |
| 5,100,947 A | 3/1992 | Puydak et al. |
| 5,157,081 A | 10/1992 | Puydak et al. |
| 5,162,445 A | 11/1992 | Powers et al. |
| 5,232,109 A * | 8/1993 | Tirrell et al. ............. 215/247 |
| 5,376,723 A | 12/1994 | Vogt et al. |
| 5,457,146 A | 10/1995 | Ogoe et al. |
| 5,578,680 A | 11/1996 | Ando et al. |
| 5,621,045 A * | 4/1997 | Patel et al. ............. 525/237 |
| 5,786,426 A | 7/1998 | Sperling et al. |
| 5,852,118 A | 12/1998 | Horrion et al. |
| 5,936,028 A | 8/1999 | Medsker et al. |
| 5,952,425 A | 9/1999 | Medsker et al. |
| 6,001,484 A | 12/1999 | Horrion et al. |
| 6,008,312 A * | 12/1999 | Shirasaka ............. 528/75 |
| 6,072,003 A | 6/2000 | Horrion et al. |
| 6,177,517 B1 | 1/2001 | Guntherberg et al. |
| 6,207,752 B1 | 3/2001 | Abraham |
| 6,245,856 B1 | 6/2001 | Kaufman et al. |
| 6,255,389 B1 * | 7/2001 | Ouhadi et al. ............. 525/76 |
| 6,268,438 B1 | 7/2001 | Ellul et al. |
| 6,288,171 B2 | 9/2001 | Finerman et al. |
| 6,291,587 B1 | 9/2001 | Bleys |
| 6,326,084 B1 | 12/2001 | Ouhadi et al. |
| 6,369,160 B1 | 4/2002 | Knoll et al. |
| 6,414,081 B1 * | 7/2002 | Ouhadi ............. 525/66 |
| 6,437,030 B1 | 8/2002 | Coran et al. |
| 6,840,510 B2 | 1/2005 | Mitsch et al. |
| 6,946,522 B2 * | 9/2005 | Jacob et al. ............. 525/191 |
| 2002/0010265 A1 | 1/2002 | Johnson et al. |
| 2003/0083434 A1 * | 5/2003 | Ouhadi et al. ............. 525/80 |
| 2004/0077791 A1 | 4/2004 | Issum et al. |
| 2004/0127629 A1 * | 7/2004 | Jacob et al. ............. 524/474 |
| 2004/0167281 A1 * | 8/2004 | Takamatsu et al. ............. 525/99 |
| 2004/0260023 A1 * | 12/2004 | Park et al. ............. 525/131 |

FOREIGN PATENT DOCUMENTS

| | | |
|---|---|---|
| EP | 0 569 746 | 11/1993 |
| GB | 2 261 221 | 5/1993 |
| JP | 53143653 | 12/1978 |
| JP | 63-278963 | 11/1988 |
| JP | 7-293550 | 11/1995 |
| WO | WO 96/20249 | 7/1996 |
| WO | WO 96/23823 | 8/1996 |
| WO | WO 00/37553 | 6/2000 |
| WO | 01/10950 | 2/2001 |
| WO | WO 01/10950 A1 | 2/2001 |
| WO | WO 02/064676 A2 * | 8/2002 |
| WO | WO 2005/028555 | 3/2005 |

OTHER PUBLICATIONS

Ellul et al., "*Crosslink Densities and Phase Morphologies in Dynamically Vulcanized TPEs*", Rubber Chemistry and Technology, 1995, vol. 68, pp. 573-584.

\* cited by examiner

THERMOPLASTIC VULCANIZATES AND SEALING DEVICES MADE THEREWITH

FIELD OF THE INVENTION

One or more embodiments of the present invention relates to sealing articles that include a thermoplastic vulcanizate.

BACKGROUND OF THE INVENTION

Containers for storing fluids such as liquids have been closed or sealed by employing various devices. For example, bottles, such as wine bottles, have been sealed by employing cylindrically shaped devices called corks. These devices, which are typically fabricated from cellulosic material, are compressed and placed into the opening of a bottle. Upon expansion of the cork, the bottle can be sealed thereby preventing the escape of fluid contained within the bottle.

In certain instances, it may be important to minimize or prevent the contamination of certain fluids stored within containers. For example, it is important to prevent medical fluids (e.g., medications or bodily fluids) from being contaminated or impacted by oxygen. Accordingly, it is highly advantageous to seal these containers with devices that prevent oxygen permeation into the container. As a result, corks or stoppers employed in conjunction with containers used in the medical industry often include natural or synthetic rubbers that exhibit low oxygen permeability.

Not only is contamination by oxygen is a concern, there is also a need in the industry, particularly in the medical industry, to allow for the addition and withdrawal of fluids from these containers. For example, as described in U.S. Pat. Nos. 6,840,510 and 5,232,109, a hypodermic needle or infusion spike is inserted through the stopper in order to add or withdraw fluid from the container. Upon removal of the hypodermic needle or infusion spike, the stopper advantageously reseals itself.

While both low oxygen permeability and curability (i.e., the ability to reseal after puncture) are important features for stopper devices, the ability to manufacture stopper devices by efficient and economic processing techniques is likewise important. Where natural or synthetic rubbers are employed to manufacture these devices, the fabrication techniques are often limited to rubber casting or thermosetting techniques. In other words, the rubber is cured within a mold and released from the mold after the curing process.

Thermoplastic elastomers include materials that exhibit many of the properties of thermoset elastomers yet are processable as thermoplastics. One type of thermoplastic elastomer is a thermoplastic vulcanizate, which includes fully cured or partially cured rubber within a thermoplastic matrix. Thermoplastic vulcanizates are conventionally produced by dynamic vulcanization, which includes a process whereby a rubber can be cured or vulcanized within a blend with thermoplastic resin while the polymers are undergoing mixing or masticating at some elevated temperature, preferably above the melt temperature of the thermoplastic resin. For example, WO 01/10950 teaches thermoplastic vulcanizates that include a thermoplastic polyurethane having one major glass transition temperature of less than 60° C. and an a polar rubber. The a polar rubber may include butadiene rubber, styrene-butadiene rubber, isoprene rubber, natural rubber, butyl rubber, ethylene-propylene rubber, ethylene-propylene-diene monomer rubber, or others. The thermoplastic vulcanizate may also include other constituents commonly employed in the art including extender oils.

Despite the fact that thermoplastic elastomers, particularly thermoplastic vulcanizates, have been known for many years, and the need for useful stoppers, particularly for the medical industry, has existed for many years, technologically useful stoppers prepared from thermoplastic vulcanizates do not exist in the prior art. Inasmuch as thermoplastic vulcanizates provide an efficient and economical route to the preparation of stoppers, the ability to fabricate stoppers from plastic vulcanizate would be desirable.

SUMMARY OF THE INVENTION

The present invention includes an article for sealing the contents of a container, the article comprising a member adapted for sealing the container, where the member includes a thermoplastic vulcanizate including a dynamically cured butyl rubber, a thermoplastic polyurethane having a glass transition temperature of less than about 60° C., and a synthetic oil.

The present invention also includes a thermoplastic vulcanizate a dynamically cured butyl rubber, a thermoplastic polyurethane having a glass transition temperature of less than about 60° C., and a synthetic oil.

DETAILED DESCRIPTION OF ILLUSTRATIVE EMBODIMENTS

One or more embodiments of the present invention are directed toward articles for sealing a container. In one or more embodiments, these articles may be referred to as corks, stoppers, caps, or sealing devices. In one or more embodiments, the articles include at least one member that includes a particular thermoplastic vulcanizate, and as a result, the articles demonstrate technologically useful coring properties, sealing properties, and low air permeability. In view of these characteristics, the articles of one or more embodiments may advantageously be employed in conjunction with containers that are useful for holding fluids, such as medical fluids, which are desirably sealed within a container.

In one or more embodiments, the thermoplastic vulcanizates include dynamically-cured butyl rubber, a thermoplastic polyurethane resin, a synthetic oil, optionally a compatibilizer, and optionally other components or constituents that are typically included in thermoplastic vulcanizates.

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinyl styrene. Exemplary alkyl substituted vinyl aromatic monomers include α-methyl styrene and paramethyl styrene. These copolymers and terpolymers may also be halogenated such as in the case of chlorinated and brominated butyl rubber. In one or more embodiments, these halogenated polymers may derive from monomer such as parabromomethylstyrene.

In one or more embodiments, butyl rubber includes copolymers of isobutylene and isoprene, copolymers of isobutylene and paramethyl styrene, as described in U.S. Pat. No. 5,013,793, which is incorporated herein by reference for purpose of U.S. patent practice, terpolymers of isobutylene, isoprene, and divinyl styrene, as described in U.S. Pat. No. 4,916,180, which is incorporated herein by reference for purpose of U.S. patent practice, and branched butyl rubber, as described in U.S. Pat. No. 6,255,389, which is incorporated herein by reference for purpose of U.S. patent practice, and brominated copolymers of isobutene and paramethylstyrene (yielding copolymers with parabromomethylstyrenyl mer units) as described in U.S. Pat. No. 5,162,445, which is incorporated herein by reference for purpose of U.S. patent practice. These copolymers and terpolymers may be halogenated.

In one embodiment, where butyl rubber includes the isobutylene-isoprene copolymer, the copolymer may include from about 0.5 to about 30, or from about 0.8 to about 5, percent by weight isoprene based on the entire weight of the copolymer with the remainder being isobutylene.

In another embodiment, where butyl rubber includes isobutylene-paramethyl styrene copolymer, the copolymer may include from about 0.5 to about 25, and from about 2 to about 20, percent by weight paramethyl styrene based on the entire weight of the copolymer with the remainder being isobutylene. In one embodiment, isobutylene-paramethyl styrene copolymers can be halogenated, such as with bromine, and these halogenated copolymers can contain from about 0 to about 10 percent by weight, or from about 0.3 to about 7 percent by weight halogenation.

In other embodiments, where butyl rubber includes isobutylene-isoprene-divinyl styrene, the terpolymer may include from about 95 to about 99, or from about 96 to about 98.5, percent by weight isobutylene, and from about 0.5 to about 5, or from about 0.8 to about 2.5, percent by weight isoprene based on the entire weight of the terpolymer, with the balance being divinyl styrene.

In the case of halogenated butyl rubbers, the butyl rubber may include from about 0.1 to about 10, or from about 0.3 to about 7, or from about 0.5 to about 3 percent by weight halogen based upon the entire weight of the copolymer or terpolymer.

In one or more embodiments, the glass transition temperature (Tg) of useful butyl rubber can be less than about −55° C., or less than about −58° C., or less than about −60° C., or less than about −63° C.

In one or more embodiments, the Mooney viscosity ($ML_{1+8}$@125° C.) of useful butyl rubber can be from about 25 to about 75, or from about 30 to about 60, or from about 40 to about 55.

Useful butyl rubber includes that prepared by polymerization at low temperature in the presence of a Friedel-Crafts catalyst as disclosed within U.S. Pat. Nos. 2,356,128 and 2,944,576. Other methods may also be employed.

Butyl rubber can be obtained from a number of commercial sources as disclosed in the Rubber World Blue Book. For example, both halogenated and un-halogenated copolymers of isobutylene and isoprene are available under the tradename Exxon Butyl™ (ExxonMobil Chemical Co.), halogenated and un-halogenated copolymers of isobutylene and paramethyl styrene are available under the tradename EXXPRO™ (ExxonMobil Chemical Co.), star branched butyl rubbers are available under the tradename STAR BRANCHED BUTYL™ (ExxonMobil Chemical Co.), and copolymers containing parabromomethylstyrenyl mer units are available under the tradename EXXPRO 3745 (ExxonMobil Chemical Co.). Halogenated and non-halogenated terpolymers of isobutylene, isoprene, and divinyl styrene are available under the tradename Polysar Butyl™ (Bayer; Germany).

The butyl rubber may be partially of fully cured or crosslinked. In one embodiment, the butyl rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one embodiment, the rubber has a degree of cure where not more than 15 weight percent, in other embodiments not more than 10 weight percent, in other embodiments not more than 5 weight percent, and in other embodiments not more than 3 weight percent is extractable by cyclohexane at 23° C. as described in U.S. Pat. Nos. 5,100,947 and 5,157,081, which are incorporated herein by reference for purpose of U.S. patent practice. Alternatively, in one or more embodiments, the rubber has a degree of cure such that the crosslink density is preferably at least $4 \times 10^{-5}$, in other embodiments at least $7 \times 10^{-5}$, and in other embodiments at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol 68, pp. 573-584 (1995).

In one or more embodiments, thermoplastic polyurethane (TPU) includes thermoplastic elastomer copolymers including one or more polyurethane hard blocks or segments and one or more soft blocks. In one or more embodiments, these copolymers include those compositions obtained by reacting multi-functional isocyanate(s) with chain extender(s) and optionally macroglycol(s). In one or more embodiments, these reactions occur an isocyanate index of at least 95 and in other embodiments at least 98; in these or other embodiments, these reactions occur at an isocyanate index of 105 or less, and in other embodiments 102 or less.

In one or more embodiments, thermoplastic polyurethane includes a blend of different thermoplastic polyurethanes in such amounts that the blend has at least one major $T_g$ of less than 60° C.

Isocyanate index includes the ratio of isocyanate-groups over isocyanate-reactive hydrogen atoms present in a formulation, given as a percentage. In other words, the isocyanate index expresses the percentage of isocyanate actually used in a formulation with respect to the amount of isocyanate theoretically required for reacting with the amount of isocyanate-reactive hydrogen used in a formulation. In one or more embodiments, isocyanate index is considered from the point of view of the actual polymer forming process involving the isocyanate ingredient and the isocyanate-reactive ingredients. Any isocyanate groups consumed in a preliminary step to produce modified polyisocyanates (including isocyanate-derivatives referred to in the art as quasi- or semi-prepolymers) or any active hydrogens reacted with isocyanate to produce modified polyols or polyamines, are not taken into account in the calculation of the isocyanate index; only the free isocyanate groups and the free isocyanate-reactive hydrogens present at the actual elastomer forming stage are taken into account.

TPU can be produced in the so-called one-shot, semi-prepolymer or prepolymer method, by casting, extrusion, or any other process known to the person skilled in the art.

In one or more embodiments, useful multi-functional isocyanates include organic diisocyanates and polyisocyanates such as aliphatic, cycloaliphatic and aralphatic polyisocyanates. Examples of diisocyanates include hexamethylene diisocyanate, isophorone diisocyanate, cyclohexane-1,4-diisocyanate, 4,4'-dicyclohexylmethane diisocyanate and m- and p-tetramethylxylylene diisocyanate. Examples of aromatic polyisocyanates include tolylene diisocyanates (TDI), phenylene diisocyanates, diphenylmethane diisocyanates (MDI), and MDI comprising 4,4'-diphenylmethane diisocyanate.

In one or more embodiments, the diphenylmethane diisocyanates may consist essentially of pure 4,4'-diphenylmethane diisocyanate or mixtures of that diisocyanate with one or more other organic polyisocyanates including other diphenylmethane diisocyanate isomers such as the 2,4'-isomer optionally in conjunction with the 2,2'-isomer. The polyisocyanate may also be an MDI-variant derived from a polyisocyanate composition containing at least 85% by weight of 4,4'-diphenylmethane diisocyanate. MDI variants include liquid products obtained by introducing carbodiimide groups into said polyisocyanate composition and/or by reacting with one or more polyols.

In one or more embodiments, the polyisocyanate includes at least 90% by weight of 4,4'-diphenylmethane diisocyanate, and in other embodiments at least 95% by weight of 4,4'-diphenylmethane diisocyanate.

In one or more embodiments, chain extenders include di-functional isocyanate-reactive species. In these or other embodiments, these di-functional compounds are characterized by a molecular weight of less than 500. In one or more embodiments, the chain extender includes a diol, and in certain embodiments a branched diol. In one or more embodiments, blends of different types of diols are employed.

Examples of chain extenders include aliphatic diols, such as ethylene glycol, 1,3-propanediol, 1,4-butanediol, 1,6-hexanediol, 1,2-propanediol, 1,3-butanediol, 2,3-butanediol, 1,3-pentanediol, 1,2-hexanediol, 3-methyl-1,5-pentanediol, diethylene glycol, dipropylene glycol and tripropylene glycol. In one or more embodiments, the chain extenders include an odd-number of carbon atoms between the hydroxyl groups. In these or other embodiments, the chain extenders with a branched chain structure such as 2-methyl-1,3-propanediol, 2,2-dimethyl-2,3-propanediol, 1,3-propanediol, 1,5-pentanediol are employed. In one or more embodiments, cycloaliphatic diols such as 1,4-cyclohexanediol, 1,2-cyclohexanediol, 1,4-cyclohexanedimethanol or 1,2-cyclohexanedimethanol, and aromatic diols such as hydroquinone bis (hydroxyethylether) and the like can also be used. Other examples include neopentylglycol, 1,3-propanediol and 2-methyl-1,3-propanediol. In certain embodiments, other diols having a molecular weight of less than 500 containing an alkylene group with an odd number of carbon atoms between the two hydroxyl groups can be employed.

In one or more embodiments, the macroglycols include compounds having a molecular weight of between 500 and 20,000. In these or other embodiments, macroglycols can be used in an amount such that the TPU has at least one major Tg of less than 60 C. In these or other embodiments, the macroglycol is employed in an amount of from about 25 to about 75 parts by weight based upon the total weight of the TPU. The amount of macroglycols as a percentage of the total composition of the TPU may define the softblock content of the TPU.

In one or more embodiments, macroglycols include polyesters, polyethers, polyesteramides, polythioethers, polycarbonates, polyacetals, polyolefins, polysiloxanes, or mixtures two or more thereof.

Polyethers, which may be referred to as polyether glycols, may include products obtained by the polymerization of a cyclic oxide, for example ethylene oxide, propylene oxide, butylene oxide, tetrahydrofuran, or mixtures of two or more thereof, in the optional presence of an initiator such as a di-functional initiator. In one or more embodiments, suitable initiator compounds include 2 active hydrogen atoms. Examples of initiators include water, butanediol, ethylene glycol, propylene glycol, diethylene glycol, triethylene glycol, dipropylene glycol, and mixtures thereof. Mixtures of initiators and/or cyclic oxides may also be used.

Examples of polyether glycols include polyoxypropylene glycols and poly(oxyethylene-oxypropylene) glycols obtained by the simultaneous or sequential addition of ethylene or propylene oxides to di-functional initiators. Random copolymers having oxyethylene contents of 10-80%, block copolymers having oxyethylene contents of up to 25% and random/block copolymers having oxyethylene contents of up to 50%, based on the total weight of oxyalkylene units, can be employed. In one or more embodiments, those having at least part of the oxyethylene groups at the end of the polymer chain are employed. Other useful polyether glycols include polytetramethylene glycols obtained by the polymerization of tetrahydrofuran.

Polyesters, which may be referred to as polyester glycols, include hydroxyl-terminated reaction products of dihydric alcohols such as ethylene glycol, propylene glycol, diethylene glycol, 1,4-butanediol, neopentyl glycol or 1,6-hexanediol, or mixtures of dihydric alcohols, and dicarboxylic acids and their ester-forming derivatives such as succinic, glutaric and adipic acids or their dimethyl esters, sebacic acid, phthalic anhydride, tetrachlorophthalic anhydride or dimethyl terephthalate or mixtures thereof.

Polythioether glycols include products obtained by condensing thiodiglycol either alone or with other glycols, alkylene oxides or dicarboxylic acids.

Polycarbonate glycols include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal glycols include products prepared by reacting glycols such as diethylene glycol, triethylene glycol or hexanediol with formaldehyde. Suitable polyacetals may also be prepared by polymerizing cyclic acetals.

Suitable polyolefin glycols include hydroxy-terminated butadiene homo- and copolymers and suitable polysiloxane glycols include polydimethylsiloxane diols.

Thermoplastic polyurethane resins are commercially available. For example, they can be obtained under the trademark TEXIN™ (Bayer); TEXIN™ 285 is a polyester-based thermoplastic polyurethane having a Shore A of about 85, TEXIN™ 985 is a polyether-based thermoplastic polyurethane having a Shore A of about 86, and TEXIN™ 945 is a polyether-based thermoplastic polyurethane having a Shore D of about 50. Other commercial products include PELLTHANE (Dow) and ESTANE (Noveon).

In one or more embodiments, synthetic oils include polymers and oligomers of butenes including isobutene, 1-butene, 2-butene, butadiene, and mixtures thereof. In one or more embodiments, these oligomers include isobutenyl mer units. Exemplary synthetic oils include polyisobutylene, poly(isobutylene-co-butene), polybutadiene, poly(butadiene-co-butene), and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C.; in these or other embodiments, the viscosity of these oils can be less than 4,000 cp and in other embodiments less than 1,000 cp.

In one or more embodiments, these oligomers can be characterized by a number average molecular weight ($M_n$) of from about 300 to about 9,000 g/mole, and in other embodiments from about 700 to about 1,300 g/mole.

Useful synthetic oils can be commercially obtained under the tradenames Polybutene™ (Soltex; Houston, Tex.), Indopol™ (BP; Great Britain), and Parapol™ (ExxonMobil).

In one or more embodiments, the thermoplastic vulcanizates of this invention are substantially devoid of mineral oils. By substantially devoid, it is meant that the thermoplastic vulcanizates include less mineral oil than would otherwise have an appreciable impact on the technological features of the thermoplastic vulcanizate. In one or more embodiments, the thermoplastic vulcanizates includes less than 5% by weight, and in other embodiments less than 3% by weight, in other embodiments less than 2% by weight, and in other embodiments less than 1% by weight mineral oil, where the weight percent is based on the total weight of the thermoplastic vulcanizate. In one embodiment, the thermoplastic vulcanizates are devoid of mineral oil. In one or more embodiments, mineral oils include petroleum derived oils such as saturated and unsaturated aliphatic oils, aromatic oils, and naphthenic oils.

In one or more embodiments, useful compatibilizers include maleated thermoplastics, thermoplastic elastomer block copolymers, crystallizable copolymers of propylene with ethylene or other higher α-olefins, chlorinated thermoplastics, ionomers, maleated elastomeric copolymers, and mixtures thereof.

Modified polyolefins include modified thermoplastics and modified rubbers. In one or more embodiments, these modified polyolefins include at least one functional group attached thereto. In one or more embodiments, these functional groups can include carboxylic acid; $C_1$ to $C_8$ carboxylate ester such as carbomethoxy, carboethoxy, carbopropoxy, carbobutoxy, carbopentoxy, carbohexoxy, carboheptoxy, carboctoxy, and isomeric forms thereof; carboxylic acid anhydride; carboxylate salts formed from the neutralization of carboxylic acid group(s) with metal ions from Groups I, II, III, IV-A and VII of the periodic table, illustratively including sodium, potassium, lithium, magnesium, calcium, iron, nickel, zinc, and aluminum, and mixtures thereof; amide; epoxy; hydroxy; amino; and $C_2$ to $C_6$ acyloxy such as acetoxy, propionyloxy, or butyryloxy. In one or more embodiments, these functional groups may be part of an unsaturated monomer precursor that can be copolymerized with an olefin monomer or grafted onto a polyolefin to form the modified polyolefin.

Useful functionalizing monomers or agents include acrylic acid, methacrylic acid, maleic acid, maleic anhydride, acrylamide, methacrylamide, glycidyl acrylate, glycidyl methacrylate, vinyl acetate, vinyl butyrate, methyl acrylate, ethyl acrylate, butyl acrylate, 2-hydroxyethyl acrylate, sodium acrylate, zinc acrylate, the ionic hydrocarbon polymers from the polymerization of α-olefins with α,β-ethylenically unsaturated carboxylic acids.

Useful modified polyolefins include those disclosed in U.S. Pat. Nos. 6,001,484, 6,072,003, 3,264,272, and 3,939,242, which are incorporated herein by reference.

In one or more embodiments, the mer units of the polyolefin containing the functional groups can be present in the polyolefin in an amount from about 0.05 to about 5 mole percent. For example, in the case of maleated polyethylene, from about 0.005 to about 5 mole percent of the mer units include the residue of maleic acid pendent to the backbone.

In one or more embodiments, useful modified polyolefins can be obtained under the tradename OPTEMA™ TC130 (ExxonMobil), which is an ethylmethacrylate copolymer, and POLYBOND™ (Crompton Uniroyal), or FUSABOND™ (DuPont), which are maleated polypropylenes.

Maleated elastomeric copolymers include copolymers of ethylene, an alpha-olefin, and one or more dienes, where the copolymer is reacted with maleic anhydride to provide further functionality. These copolymers are commercially available under the tradename EXXELOR (ExxonMobil).

In one or more embodiments, useful thermoplastic elastomer block copolymers include at least one hard block or segment and at least one soft block or segment. In certain embodiments, the block copolymer include two hard blocks with a soft block positioned therebetween (i.e., ABA bock copolymer). In other embodiments, the block copolymer includes two soft blocks with a hard block positioned therebetween (i.e., BAB block copolymer).

In one or more embodiments, the soft blocks can be characterized by a glass transition temperature (Tg) of less than 25° C., in other embodiments less than 0° C., and in other embodiments less than −20° C.

In one or more embodiments, the soft block can include a unit deriving from conjugated diene monomers and optionally vinyl aromatic monomers. Suitable diene monomers include 1,3-butadiene, isoprene, piperylene, phenylbutadiene, and mixtures thereof. Those units deriving from conjugated diene monomers can optionally be hydrogenated. Suitable vinyl aromatic monomers include styrene, alkyl-substituted styrenes such as paramethyl styrene, and α-methyl styrene, as well as mixtures thereof.

In one or more embodiments, the hard blocks can be characterized by a glass transition temperature (Tg) of greater than 25° C., in other embodiments greater than 50° C., and in other embodiments greater than 75° C.

In one or more embodiments, the hard blocks can include polymeric units deriving from vinyl aromatic monomers. Useful vinyl aromatics include styrene, alkyl-substituted styrenes such as paramethyl styrene, and α-methyl styrene, as well as mixtures thereof.

In one or more embodiments, useful thermoplastic elastomer copolymers include, but are not limited to, styrene/butadiene rubber (SBR), styrene/isoprene rubber (SIR), styrene/isoprene/butadiene rubber (SIBR), styrene-butadiene-styrene block copolymer (SBS), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP), hydrogenated styrene-isoprene-styrene block copolymer (SEPS), styrene-ethylene/butylene-ethylene block copolymer (SEBE), styrene-ethylene-styrene block copolymer (SES), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), ethylene-ethylene/butylene-ethylene block copolymer (EEBE) and mixtures thereof. Preferred copolymers include hydrogenated styrene-butadiene-styrene block copolymer (SEBS), and hydrogenated styrene-isoprene-styrene block copolymer (SEPS).

In one ore more embodiments, the block copolymers include those disclosed in U.S. Pat. Nos. 6,177,517 B1, and 6,369,160 B1, which are incorporated herein by reference, as well as International Patent Applications WO 96/20249 and WO 96/23823, which is incorporated herein by reference.

Other thermoplastic elastomer block copolymers include block copolymers of a hydrogenated styrene block copolymer (e.g., SEPS or SEBS) and thermoplastic polyurethane. These copolymers are commercially available under the tradename S 5865 (Septon).

In one or more embodiments, the crystallizable propylene copolymers include copolymers of propylene and at least one alpha-olefin. The copolymers include from about 5 to about 35, in other embodiments from about 10 to about 30, and in other embodiments from about 12 to about 20 mole percent units deriving from the comonomer (ethylene). In one or more embodiments, these crystallizable propylene copolymers can be characterized by propylene crystallinity.

Useful propylene copolymers are disclosed in U.S. Pat. Nos. 6,268,438, 6,288,171, and 6,245,856, which are incorporated herein by reference. Useful propylene copolymers are available under the tradename VISTAMAXX™ 1000, 2000, and 3000 (Exxon Mobil).

In one or more embodiments, chlorinated polyolefins include chlorinated poly-alpha-olefins. These poly-alpha-olefins may include from about 25 to about 45, and in other embodiments from about 30 to about 40 percent by weight chlorine, where the weight percent includes the weight of the chlorine atoms attached to the polymer backbone with respect to the overall weight of the polymer.

Chlorinated polyolefins are commercially available under the tradename TYRIN™ (DuPont).

In one or more embodiments, ionomers include polymers having a backbone composed of a thermoplastic resin and having side chains or groups pendent to that backbone that are sufficiently polar so as to have the capability of forming ionic domains (i.e., the capability to associate with one another so as to form "physical crosslinks").

Ionomeric polymers can be prepared by attaching acid groups to the polymer and then neutralizing the acid moiety with basic metal compounds (e.g., metal hydroxides, metal salts, etc.) or basic nitrogen compounds (i.e., ammonia, amines, etc.) to ionically link the polymers. The metal ions employed can include alkali metals or alkaline earth metals. The acid group may be introduced into the polymer chain in a variety of ways. One way is by introducing acid groups on the predominant polymer, e.g., sulfonating polystyrene or by copolymerising an alpha, beta-ethylenically unsaturated acid monomer with the predominant monomer, or by graft-polymerizing an alpha, beta-ethylenically unsaturated acid moiety on the predominant polymer.

Typical examples of ionomers employing salts of carboxylic acid type pendent groups are disclosed in British Patent No. 1,011,981; U.S. Pat. Nos. 3,264,272; 3,322,734; 3,338,734; 3,355,319; 3,522,222; and 3,522,223, which are incorporated herein by reference. Examples of ionomers employing phosphonate-type pendent groups include those disclosed in U.S. Pat. Nos. 3,094,144; 2,764,563, 3,097,194; and 3,255,130, which are incorporated herein by reference. Examples of ionomers employing sulfonate-type pendent groups include those disclosed in U.S. Pat. Nos. 2,714,605; 3,072,618; and 3,205,285, which are incorporated herein by reference. The polar groups pendent to the thermoplastic backbone can be present in from at least about 0.2 to about as high as 15 mole % (i.e., 0.2-15 moles per mole of monomer repeating unit), or in other embodiments 0.5 to 10 mole % of the total polymer.

Examples of thermoplastic ionomers include sulfonated polystyrene, sulfonated poly-tertiary butylstyrene, sulfonated polymethylstyrene, sulfonated polyethylene, sulfonated polypropylene, sulfonated polybutene-1, sulfonated styrene/methyl methacrylate copolymers, sulfonated styrene/acrylonitrile copolymers, methacrylonitrile copolymers, sulfonated polyformaldehyde and copolymers, sulfonated polyvinylchloride, sulfonated block copolymers of polyethylene oxide and polystyrene, acrylic acid copolymers with styrene, acrylic acid copolymers with methyl methacrylate. In one or more embodiments, the thermoplastic ionomer can be sulfonated polystyrene or sulfonated polyethylene and its copolymers. In addition to direct sulfonation of these polymers or copolymers, a technique for incorporating a proper amount of sulfonate salt in these polymers includes copolymerizing a suitable diene or di-functional molecule at a low level (e.g., 0.5 to 10%) with the desired monomer. For example, the copolymerization of 2 to 5 weight percent of ethylidene norbornene with ethylene using coordination catalysts provides a polyethylene with a small amount of unsaturation, yet the high crystallinity of polyethylene can still be maintained.

Useful ionomers are commercially available under the tradename SURLYN™ (DuPont) and IOTEK™ (Exxon Mobil).

In addition to the rubber, thermoplastic resin, and synthetic oil, the thermoplastic vulcanizates of the invention may optionally include reinforcing and non-reinforcing fillers, antioxidants, stabilizers, antiblocking agents, anti-static agents, foaming agents, pigments, flame retardants and other processing aids known in the rubber compounding art. These additives can comprise up to about 50 weight percent of the total composition. Fillers that can be utilized include conventional inorganics such as calcium carbonate, clays, silica, talc, titanium dioxide, carbon black and the like.

In one or more embodiments, the thermoplastic vulcanizates of this invention contain a sufficient amount of the butyl rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 percent by weight, in other embodiments at least about 40 percent by weight, and in other embodiments at least about 50 percent by weight butyl rubber. In one or more embodiments, the amount of butyl rubber within the thermoplastic vulcanizates can be from about 25 to about 90 percent by weight, in other embodiments from about 45 to about 85 percent by weight, and in other embodiments from about 60 to about 80 percent by weight, based on the entire weight of the butyl rubber and thermoplastic polyurethane component combined.

In one or more embodiments, the thermoplastic vulcanizates may include from about 10 to about 75 percent by weight, in other embodiments from about 15 to about 70 percent by weight, in other embodiments from about 20 to about 50 percent by weight thermoplastic polyurethane resin based upon the entire weight of the butyl rubber and thermoplastic polyurethane resin combined. The amount of the thermoplastic polyurethane resin can also be expressed with respect to the amount of the butyl rubber component. In one embodiment, the thermoplastic vulcanizates may comprise from about 5 to about 100, in other embodiments from about 10 to about 80, and in other embodiments from about 20 to about 60 parts by weight thermoplastic polyurethane resin per 100 parts by weight butyl rubber.

In one or more embodiments, the thermoplastic vulcanizates may include from about 1 to about 60 parts by weight synthetic oil, in other embodiments from about 5 to about 50 parts by weight synthetic oil, in other embodiments from about 20 to about 45 parts by weight synthetic oil, and in other embodiments from about 30 to about 40 parts by weight mineral oil per 100 parts by weight butyl rubber.

In one or more embodiments, the thermoplastic vulcanizates may include from about 1 to about 20 parts by weight, in other embodiments from about 5 to about 18 parts by weight, and in other embodiments from about 10 to about 15 parts by weight compatibilizer per 100 parts by weight butyl rubber. In one or more embodiments, where the butyl rubber includes one or more parabromomethylstyrenyl mer units, technologically useful thermoplastic vulcanizates according to the present invention can be prepared in the substantial absence of a compatibilizer. In other words, the thermoplastic vulcanizates can be prepared in the absence of that amount of compatibilizer that would otherwise have an appreciable impact on the thermoplastic vulcanizate. In one or more embodiments, the thermoplastic vulcanizates include less than 1 part by weight, in other embodiments less than 0.5 parts by weight, and in other embodiments less than 0.1 parts by weight compatibilizer per 100 parts by weight butyl rubber. In one or more embodiments, the thermoplastic vulcanizates are devoid of a compatibilizer.

Fillers, such as carbon black or clay, may be added in amount from about 3 to about 50 parts by weight or in other embodiments from about 5 to about 30 parts by weight, per 100 parts by weight of rubber. The amount of carbon black that can be used may depend, at least in part, upon the type of carbon black.

In one or, more embodiments, the butyl rubber is cured or crosslinked by dynamic vulcanization. The term dynamic vulcanization refers to a vulcanization or curing process for a rubber (e.g., butyl rubber) contained in a blend with a thermoplastic resin (e.g., thermoplastic polyurethane), wherein the rubber is crosslinked or vulcanized under conditions of high shear at a temperature above the melting point of the thermoplastic. Dynamic vulcanization can occur in the presence of the synthetic oil, or the synthetic oil can be added after dynamic vulcanization (i.e., post added), or both (i.e., some can be added prior to dynamic vulcanization and some can be added after dynamic vulcanization). In certain embodiments, it may be advantageous to add compatibilizer prior to cure; this may advantageously result in better dispersion of the rubber within the thermoplastic phase, thereby leading to improved mechanical properties. In the event that certain compatibilizers are employed, care should be taken to employ cure systems that are less sensitive to interference (e.g. butyl zimate and zinc oxide). In other embodiments, especially where sensitive cure systems are employed, certain ingredients, particularly the compatibilizers (e.g., maleated plastics or chlorinated plastics), can be added after dynamic vulcanization. In one or more embodiments, interference with the cure may be minimized by adding these ingredients after dynamic vulcanization. Those skilled in the art will be able to readily identify those ingredients that may be better suited to addition after dynamic vulcanization.

In one embodiment, the butyl rubber can be simultaneously crosslinked and dispersed as fine particles within the thermoplastic matrix, although other morphologies may also exist. Dynamic vulcanization can be effected by mixing the thermoplastic elastomer components at elevated temperature in conventional mixing equipment such as roll mills, stabilizers, Banbury mixers, Brabender mixers, continuous mixers, mixing extruders and the like. Methods for preparing thermoplastic vulcanizates are described in U.S. Pat. Nos. 4,311,628 and 4,594,390, which are incorporated herein by reference for purpose of U.S. patent practice, although methods employing low shear rates can also be used. Multiple step processes can also be employed whereby ingredients such as plastics, oils, and scavengers can be added after dynamic vulcanization has been achieved as disclosed in International Application No. PCT/US04/30517, which is incorporated herein by reference for purpose of U.S. patent practice Any cure system that is capable of curing or crosslinking butyl rubber can be employed in practicing this invention. For example, where the butyl rubber is either halogenated or non-halogenated, a phenolic cure system may be employed. In one or more embodiments, these phenolic cure systems include halogenated and non-halogenated phenolic resins that may be employed in conjunction with a catalyst or accelerator such as stannous chloride and a metal activator. Useful phenolic cure systems are disclosed in U.S. Pat. Nos. 2,972,600, 3,287,440, 5,952,425 and 6,437,030, which are incorporated herein by reference.

In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octyl phenol and nonylphenol-formaldehyde resins are employed. The blend includes from about 25 to about 40% by weight octyl phenol and from about 75 to about 60% by weight nonylphenol, more preferably, the blend includes from about 30 to about 35 weight percent octyl phenol and from about 70 to about 65 weight percent nonylphenol. In one embodiment, the blend includes about 33% by weight octylphenol-formaldehyde and about 67% by weight nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which may be referred to as alkylphenol-formaldehyde resins. SP-1045 is believed to be an octylphenol-formaldehyde resin that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a phenolic resin curative includes that defined according to the general formula where Q is a divalent radical selected from the group consisting of —$CH_2$—, —$CH_2$—O—$CH_2$—; m is zero or a positive integer from 1 to 20 and R' is an organic group. In one embodiment, Q is the divalent radical —$CH_2$—O—$CH_2$—, m is zero or a positive integer from 1 to 10, and R' is an organic group having less than 20 carbon atoms. In other embodiments, m is zero or a positive integer from 1 to 5 and R' is an organic radical having between 4 and 12 carbon atoms.

The stannous chloride can be used in its hydrous ($SnCl_2 \cdot H_2O$) or anhydrous ($SnCl_2$) form. The stannous chloride can be used in a powdered, granulated, or flake form. In one embodiment, metal oxide or acid reducing compound includes zinc oxide.

Where the butyl rubber includes a vinyl, carboxyl, or carbonyl functional group, a silicon-hydride containing cure system may be employed. For example, polysiloxanes including active silicon hydride groups can be employed in conjunction with a catalyst system such as a platinum catalyst system.

In one or more embodiments, useful silicon-containing cure systems include silicon hydride compounds having at least two SiH groups. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Useful catalysts for hydrosilation include, but are not limited to, peroxide catalysts and catalysts including transition metals of Group VIII. These metals include, but are not limited to, palladium, rhodium, and platinum, as well as complexes of these metals. Useful silicon-containing curatives and cure systems are disclosed in U.S. Pat. No. 5,936,028, which is incorporated herein by reference for purpose of U.S. patent practice.

Where a halogenated butyl rubber is used, useful cure systems include (i) zinc oxide, which may be used with an optional accelerator or (ii) an amine, which may be used with an optional catalyst. These cure systems are described in U.S. Pat. Nos. 5,013,793, 5,100,947, 5,021,500, 5,100,947, 4,978,714, and 4,810,752, which are incorporated herein by reference.

Useful accelerators that may be used in conjunction with the zinc oxide include carboxylic acids, carboxylates, maleimides, dithiocarbamates, thiurams, thioureas, and mixtures thereof. Exemplary carboxylic acids include fatty acids such as stearic acid. Exemplary carboxylates include salts of fatty acids such as zinc stearate. Exemplary maleimides include bismaleimides such m-phenylene bismaleimide (4,4'-m-phenylene bismaleimide), 4,4'-vinylenediphenyl bismaleimide, p-phenylene bismaleimide, 4,4'-sulfonyldiphenyl bismaleimide, 2,2'-dithiodiphenyl bismaleimide, 4,4'-ethylene-bis-oxophenyl bismaleimide, 3,3'-dichloro-4,4'-biphenyl bismaleimide, o-phenylene bismaleimide, m-phenylene bismaleimide (HVA-2), hexamethylene bismaleimide, and 3,6-durine bismaleimides. Exemplary dithiocarbamates, thiurams, and thioureas include 2,6-di-tert-butyl-para-cresol; N,N'-diethylthiourea; di-ortho-tolylguanidine; dipentamethylene thiuram tetrasulfide; ethylene trithiocarbonate; 2-mercaptobenzothiazole; benzothiazole disulfide; N-phenyl-beta-naphthylamine; tetramethyl thiuram disulfide, zinc diethyldithiocarbamate, zinc dibutyldithiocarbamate, and zinc dimethyldithiocarbamate.

Useful amines include multi-functional amines, especially blocked or hindered diamines. Exemplary hindered amines include hexamethylene diamine carbamate, which is a blocked diamine having carbon dioxide blocking the amine function to form a carbamate. This diamine is commercially available under the tradename DIAK (DuPont Company). Useful catalysts that may be used in conjunction with the amines include organic acids and salts thereof as well as metal hydroxides, especially Group I and Group II hydroxides. The organic acids include dicarboxylic acids. Exemplary carboxylic acids include stearic acid. Preferred salts of organic acids include zinc stearate. In one embodiment metal hydroxides include $Mg(OH)_2$.

The skilled artisan will be able to readily determine a sufficient or effective amount of vulcanizing agent to be employed without undue calculation or experimentation.

Despite the fact that the rubber may be partially or fully cured, thermoplastic vulcanizates can be processed and reprocessed by conventional plastic processing techniques such as extrusion, injection molding, blow molding, and compression molding. In one or more embodiments, the butyl rubber within these thermoplastic elastomers can be in the form of finely-divided and well-dispersed particles of vulcanized or butyl rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 µm, optionally less than 30 µm, optionally less than 10 µm, optionally less than 5 µm, and optionally less than 1 µm. In certain embodiments, at least 50%, optionally at least 60%, and optionally at least 75% of the particles have an average diameter of less than 5 µm, optionally less than 2 µm, and optionally less than 1 µm.

The present invention is not limited to the selection or fabrication of any particular configuration for the article for sealing a container, or by the container with which the article is employed. In one or more embodiments, the sealing article may include a single component, solid structure including the thermoplastic vulcanizate. In other embodiments, the article may include a multicomponent structure where at least one of the components includes the thermoplastic vulcanizate. In one or more embodiments, the shape of the article according to the present invention can be generally cylindrical in nature including conical and frustoconical (i.e., frustums) shapes.

Figure 1:
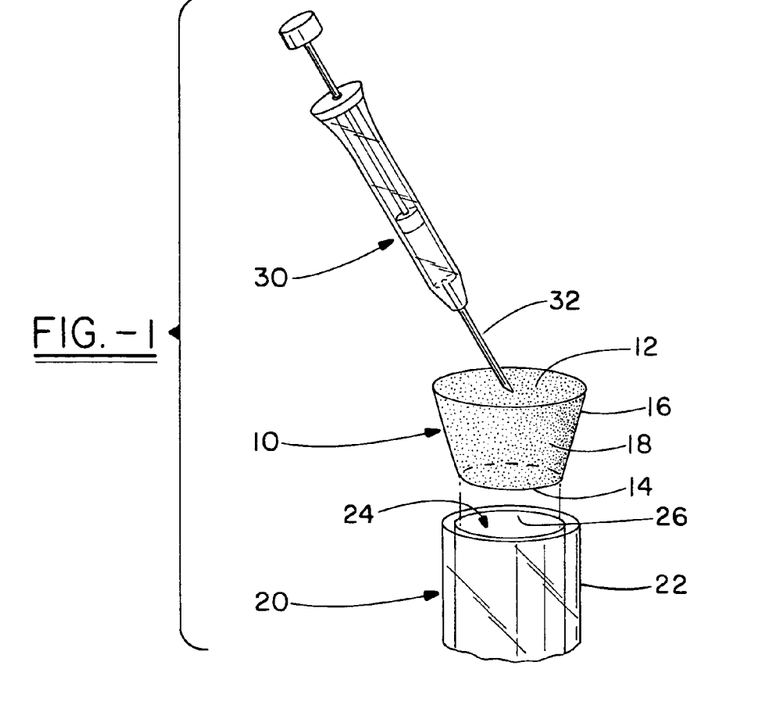
FIG. 1 is a perspective view of an article for sealing a container according to one or more embodiments of the present invention, where the article is adapted to seal a particular container by insertion into the container.

One embodiment of a stopper according to the present invention can be described with reference to FIG. 1. Stopper 10, which may also be referred to as sealing article 10, includes top surface 12, bottom surface 14, and frustoconical side wall 16. In one or more embodiments, the stopper can be employed in conjunction with container 20, which may include cylindrical side wall 22. Stopper 10 can seal container 20 by inserting stopper 10 into opening 24 of container 20. Inasmuch as the contact surface 18 of frustoconical side wall 16 may include the thermoplastic vulcanizates of this invention, application of pressure to top surface 12 in a direction perpendicular to opening 24 of container 20 will cause frustoconical side wall 16 to contact the inner wall 26 of container 20, which will in turn cause frustoconical surface 16 to compress and thereby secure stopper 10 into container 20 and seal the contents thereof. Inasmuch as the physical and dynamic properties of the thermoplastic vulcanizate employed to fabricate stopper 10 are advantageous in this application or use, in one or more embodiments, stopper 10 can be removed from container 20 and be reused.

In one or more embodiments, the physical characteristics of the thermoplastic vulcanizates employed to fabricate stopper 10 advantageously allow for the removal of at least a portion of the contents of container 20 by penetrating through stopper 10. For example, a conventional hypodermic needle 30 can be employed by inserting needle 32 into top surface 12 and through lower surface 14 to access the contents (e.g., fluids) within container 20. The contents of container 20 can be drawn into hypodermic needle 30 using conventional procedures, and the needle can be withdrawn from stopper 10.

Advantageously, the use of the thermoplastic vulcanizates of one or more embodiments of this invention in the fabrication of stopper 10 will allow for the resealing or closure of the hole caused by insertion of needle 32 into stopper 10 upon removal of needle 32.

Figure 2:
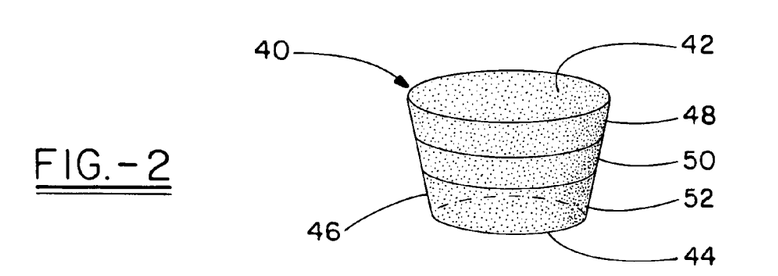
FIG. 2 is a perspective view of a multi-layered article for sealing a container according to one or more embodiments of the present invention.

Another embodiment of the present invention can be described with reference to FIG. 2. Multi-component stopper 40, which may also be referred to as sealing article 40, includes top surface 42, bottom surface 44, and frustoconical sidewall 46. Stopper 40 includes a layered structure including first layer or top layer 48, second or middle layer 50, and third or bottom layer 52. In one or more embodiments, at least one of top layer 48, bottom layer 52, or in certain embodiments both top layer 48 and bottom layer 52, include the thermoplastic vulcanizates described herein, which include butyl rubber, thermoplastic polyurethane, and synthetic oil. Second or middle layer 50 includes a thermoset rubber or thermoplastic vulcanizate that may have characteristics that are distinct from the thermoplastic vulcanizate of the top layer 48 or bottom layer 52. In one or more embodiments, the characteristics of middle layer 50 may be characterized by one or more properties that are not as advantageous as the properties of the thermoplastic vulcanizate of the top layer 48 or bottom layer 52. In other embodiments, certain properties of the middle layer 50 may be superior to the properties of the top layer 48 or bottom layer 52 (e.g., superior compression set).

In one or more embodiments, top layer 48 can be at least 0.05 mm thick, in other embodiments at least 0.1 mm thick, and in other embodiments from about 1 to about 5 mm thick. In one or more embodiments, middle layer 50 can be at least 0.05 mm thick, in other embodiments at least 0.1 mm thick, and in other embodiments from about 1 to about 5 mm thick. In one or more embodiments, bottom layer 52 can be at least 0.05 mm thick, in other embodiments at least 0.1 mm thick, and in other embodiments from about 1 to about 5 mm thick.

As a result of this configuration, the stopper of one or more embodiments may advantageously demonstrate low oxygen permeability and good coring properties deriving from the thermoplastic vulcanizates of the top and/or bottom layers 48 and 52, and may advantageously exhibit technologically useful sealability to containers or the like deriving at least in part from the optional low compression set of middle layer 50. In one or more embodiments, technologically useful seal or sealability includes advantageous oxygen permeability or lack thereof advantageous liquid permeability or lack thereof, a combination thereof, or in certain embodiments a hermetic seal.

Figure 3:
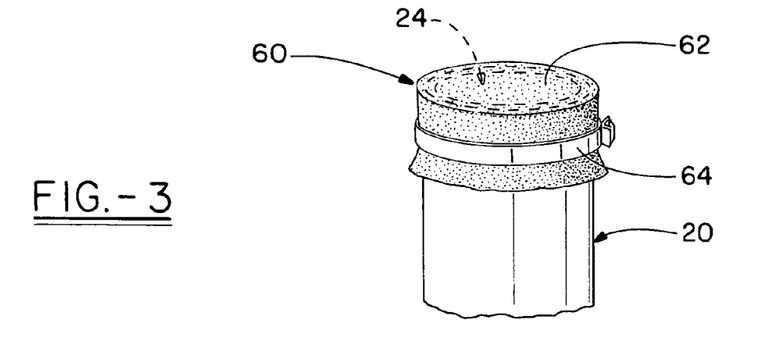
FIG. 3 is a perspective view of an article for sealing a container according to one or more embodiments of the present invention, where the article seals a particular container by circumscribing the container.

Yet another embodiment of a stopper according to the present invention can be described with reference to FIG. 3. Sealing article 60, which may also be referred to as cap 60, includes a sheet 62 fastened over opening 24 of container 20. Sheet 62, which includes the thermoplastic vulcanizate employed in the previous embodiments, can be fastened or secured to container 20 by employing a variety of fastening devices. For example, as shown in FIG. 3, a fastening band 64 secures sheet 62 to container 20, thereby sealing the contents thereof. In one embodiment, fastening band 64 includes a metal band that is crimped to secure sheet 62 to container 20.

In one or more embodiments, sheet 62 includes a die-cut sheet of thermoplastic vulcanizate having a thickness of from about 1 to about 10 mm, in other embodiments from about 1.5 to about 7 mm, and in other embodiments from about 2 to about 5 mm. In one or more embodiments, the die-cut sheet is circular in configuration, thereby allowing the sheet to be easily secured over a container opening that is generally round in configuration. As those skilled in the art will appreciate, other configurations can be die cut, thereby allowing for facile application to a variety of container opening.

In one or more embodiments, the sealing articles of this invention, or a member thereof, can advantageously be fabricated by employing injection molding processes. In general, these processes include heating the thermoplastic vulcanizate to a temperature that is equal to or in excess of the melt temperature of the thermoplastic polyurethane resin to form a pre-form, forming the pre-form within a mold to form a molded part, cooling the molded part to a temperature at or below the crystallization temperature of the thermoplastic vulcanizate, and releasing the molded part from a mold. In one or more embodiments, a melt of thermoplastic vulcanizate is injected from a reservoir through a runner into a cavity within a closed split mold. The mold cavity defines the shape of the molded part (e.g., stopper). The molded part is cooled within the mold at a temperature at or below the crystallization temperature of the thermoplastic vulcanizate, and the molded part can subsequently be injected from the mold.

In other embodiments, particularly where the sealing articles are configured as a sheet that can be fastened to a container, the sheet can be fabricated by extruding a sheet of desired thickness and subsequently die cutting a seal or cap of desired configuration. The seal can then be positioned over an opening of a container, and fastened thereto. For example, a metal band can be positioned circumferentially around the outside of a circular opening in a container while maintaining at least a portion of the sheet between the container and the band. The metal band can then be secured to the container by employing techniques such as crimping. Other methods of securing a fastening article can be used such as an adjustable ring clamp or a crimped aluminum ring.

In certain embodiments, more than one type of sealing device can be employed to seal a container. For example, a stopper device 10 can be inserted into an opening of a container 20, and then a seal 62 can be placed over the container and fastened thereto.

The thermoplastic vulcanizates employed in the fabrication of sealing articles according to the present invention are advantageous in several respects. In one respect, the thermoplastic vulcanizates of one or more embodiments exhibit sufficient flow properties so that the thermoplastic vulcanizates are technologically useful in injection molding processes. For example, the thermoplastic vulcanizates of one or more embodiments of this invention are characterized by LCR viscosity of less than 200 Pa@1,200 $s^{-1}$, and in other embodiments less than 150 Pa@1,200 $s^{-1}$, and in other embodiments less than 100 Pa@1,200 $s^{-1}$, where LCR viscosity is measured by with a Dynisco™ capillary rheometer at 30:1 aspect ratio at 1,200 $s^{-1}$ @204° C. In these or other embodiments, the thermoplastic vulcanizates of one or more embodiments can also be characterized by an ACR viscosity of less than 4,500 poise, in other embodiments less than 4,000 poise, and in other embodiments less than 3,000 poise, where the ACR viscosity measured by using an automated capillary rheometer that was equipped with a number AX150 33/1 L/D ratio, 0.031 diameter orifice, at 204° C. and 118 KPa.

The thermoplastic vulcanizates of one or more embodiments are also advantageous inasmuch as they are characterized by low oxygen permeability. In one or more embodiments, the thermoplastic vulcanizates are characterized by an oxygen permeability of less than 600 cc/m·m·day, in other embodiments less than 550 cc/m·m·day, and in other embodiments less than 500 cc/m·m·day when measured according to ASTM D1434.

The thermoplastic vulcanizates of one or more embodiments are also characterized by an advantageously low compression set. In one or more embodiments, the thermoplastic vulcanizates exhibit a compression set of less than 40%, in other embodiments less than 30%, and in other embodiments less than 20% where the compression set is measured by ASTM D-395B Furthermore, the thermoplastic vulcanizates of one or more embodiments are also characterized by an advantageous coreability. In one or more embodiments, this coreability is characterized by less than 5, in other embodiments less than 3, and in other embodiments less than 2 cores per 100 punctures when a disk of thermoplastic vulcanizate measuring about 2 millimeters thick is crimped to a 10 cc vile and subject to puncture by a 20 gage hypodermic syringe needle at a 90° angle to displace about 1-2 ml of water into the vile followed by removal of the needle from the stopper; this step is repeated five times on each of 20 files using care not to insert the needle at the same point more than once; after each of the stoppers is punctured five times, the total number of cores are counted. The needles were replaced after 25 punctures. For purposes of this specification, this test will refer to the "coreability" of the thermoplastic vulcanizate or sealing device.

The articles for sealing containers according to the present invention can be used in conjunction with a multitude of containers. These containers may include, but are not limited to, bottles, vials, test tubes, beakers, medical containers, and blood sampling containers. These containers include those conventional in the art including those fabricated of glass, polyethylene terephthalate, polycarbonate, various multi-layered or laminate composites, and the like.

Articles of the present invention are particularly advantageous when employed in combination with containers whose contents are oxygen sensitive. In these or other embodiments, the articles of this invention are advantageous with containers whose contents are desirably accessed by precision metering devices such as syringes or hypodermic needles. In one or more embodiments, the contents of these containers include medical fluids including, but not limited to, blood, other bodily fluids, saline, and medications.

In order to demonstrate the practice of the present invention, the following examples have been prepared and tested. The examples should not, however, be viewed as limiting the scope of the invention. The claims will serve to define the invention.

EXAMPLES

Samples 1-4

Four thermoplastic vulcanizates were prepared and tested for various properties. These thermoplastic vulcanizates were prepared by employing conventional techniques within a Brabender mixer. The following ingredients were used in each sample. The ingredients optionally included 100 parts by weight butyl rubber, 10 parts by weight clay, 6 parts by weight silicon hydride, and 10 parts by weight platinum catalyst mixture. The ingredients also included, as specified in Table I, polypropylene, thermoplastic polyurethane, compatibilizer, and synthetic oil. The polypropylene was characterized by a melt flow index of 750. Thermoplastic polyurethane I was a polyester-based TPU having a Shore A of about 85, and was obtained under the tradename TEXIN™ 285. Thermoplastic polyurethane II was characterized as a polyether-based resin having a Shore A of about 86 and was obtained under the tradename TEXIN™ 985. The maleated polypropylene had an MFR of about 5, and was obtained under the tradename FUSABOND™ 353D (DuPont). The SEPS copolymer was a hydrogenated styrene-isoprene-styrene block copolymer and was obtained under the tradename SEPTON™ 2002 (Kurraray). The synthetic oil was characterized by a molecular weight of 950, and was obtained under the tradename PARAPOL™ 950 (ExxonMobil). The butyl rubber was characterized by a Mooney Viscosity ($ML_{1+4}$@100° C.) of about 51, and was obtained under the tradename BUTYL XL™ 10,000 (Polysar). The clay was obtained under the tradename ICECAP™ K. The silicon hydride was a polysiloxane with silicon hydride functionality. The catalyst mixture included 0.0055 parts by weight platinum catalyst and 2.49 parts by weight mineral oil.

TABLE I

|  | AES # | | | |
|---|---|---|---|---|
|  | 322-1 | 322-2 | 322-4 | 322-5 |
|  | Sample | | | |
|  | 1 | 2 | 3 | 4 |
| Polypropylene | 40 | — | — | — |
| Thermoplastic Polyurethane I | — | 25 | — | — |
| Thermoplastic Polyurethane II | — | — | 25 | 25 |
| Maleated Polypropylene | — | 15 | 15 | 15 |
| SEPS Copolymer | — | — | — | 20 |
| Synthetic Oil | 40 | 40 | 40 | 40 |
| Properties | | | | |
| Shore A Hardness | 63 | 42 | 32 | 35 |
| Ultimate Tensile Strength (psi) | 709 | 541 | 296 | 274 |
| Modulus @100 (psi) | 375 | 237 | 158 | 149 |
| Elongation @ Break (%) | 275 | 255 | 234 | 345 |
| Tension Set (%) | 11 | 8 | 8 | 7 |
| Compression Set @ 22 hr., 100° C. | 33.8 | 38.8 | 44.3 | 35.8 |

Shore hardness was determined according to ASTM ISO 868. Ultimate tensile strength, ultimate elongation, and 100% modulus were determined according to ASTM D-412 at 23° C. by using an Instron testing machine. Tension set was determined according to ASTM D-142. Compression Set was determined according to ASTM D-395B. LCR Viscosity is measured with a Dynisco™ Capillary rheometer at 30:1 L/D (length/diameter) at 1200 $s^{-1}$ at 204° C.

The data in Table I demonstrates that the use of a thermoplastic polyurethane in lieu of a thermoplastic resin such as polypropylene allows for the formation of softer thermoplastic vulcanizates, which is advantageous because softer thermoplastic vulcanizates allow for the manufacture of flexible stoppers with good sealability.

Samples 5-9

Five additional thermoplastic vulcanizates were prepared and tested in a similar fashion to Samples 1-4, except that a different butyl rubber was employed, as well as a distinct cure system. Specifically, the ingredients employed included 100 parts by weight butyl rubber, 10 parts by weight clay, 4 parts by weight zinc oxide, and 2 parts by weight zinc dibutyldithiocarbamate. Additionally, the ingredients optionally included, as set forth in Table II, polypropylene, thermoplastic polyurethane, a compatibilizer (maleated polypropylene or SEPS copolymer), and synthetic oil. The chlorobutyl rubber was characterized by a Mooney viscosity ($ML_{1+4}$@100° C.) of about 50, and was obtained under the tradename CHLOROBUTYL™ 168. The zinc dibutyldithiocarbamate was obtained under the tradename BUTYL ZIMATE (Vanderbilt). All other ingredients were similar to those employed in Samples 1-4.

TABLE II

| | AES # | | | | |
|---|---|---|---|---|---|
| | 326-1 | 326-2 | 326-3 | 326-4 | 326-5 |
| | Sample | | | | |
| | 5 | 6 | 7 | 8 | 9 |
| Polypropylene | 40 | 20 | — | — | — |
| Thermoplastic Polyurethane II | — | 25 | 25 | 25 | 25 |
| Maleated Polypropylene | — | 15 | 15 | 15 | 15 |
| SEPS Copolymer | — | — | — | — | 20 |
| Synthetic Oil | 40 | — | 40 | — | — |
| Properties | | | | | |
| Shore A Hardness | 56.5 | 67 | 29.5 | 35 | 42 |
| Ultimate Tensile Strength (psi) | 600 | 616 | 220 | 308 | 455 |
| Modulus @100 (psi) | 220 | 496 | 130 | 170 | 230 |
| Elongation @ Break (%) | 327 | 170 | 227 | 230 | 240 |
| Tension Set (%) | 10 | 12 | 7 | 8 | 6 |
| Compression Set @ 22 hr., 100° C. | 35 | 39.4 | 27 | 41.4 | 30.2 |

The data in Table II shows that thermoplastic vulcanizates according to the present invention can be fabricated using different forms of butyl rubber. Namely, the results obtained using chlorobutyl rubber were as advantageous as Samples 1-4.

Samples 10-19

In a similar fashion to the previous samples, ten thermoplastic vulcanizates were prepared by employing yet another butyl rubber. Specifically, the ingredients included 100 parts by weight butyl rubber, 10 parts by weight clay, 4 parts by weight zinc oxide, and 2 parts by weight butyl Zimate. Additionally, the ingredients optionally included, as set forth in Table III, thermoplastic polyurethane, polypropylene, and an SEPS copolymer. The butyl rubber was characterized by a Mooney Viscosity ($ML_{1+8}$@125° C.) of 50 and included about 2% bromine and about 7.5% mer units deriving from paramethylstyrene, and was obtained under the tradename EXXPRO™ 3745. Thermoplastic polyurethane III was a polyether based TPU having a Shore D of about 50, and was obtained under the tradename TEXIN™ 945.

As with the previous samples, the data in Table III shows that useful thermoplastic vulcanizates can be prepared with the use of yet another butyl rubber. Also, the data shows that this particular butyl rubber can advantageously be employed in the absence of a compatibilizer.

Samples 20 and 21

As with the previous sample, two additional thermoplastic vulcanizates were prepared and tested. The butyl rubber was similar to that employed in Samples 1-4 (i.e., BUTYL™ XL 10,000). The ingredients include 100 parts by weight butyl rubber, 10 parts by weight clay, 10 parts by weight catalyst mixture, 3 parts by weight silicon hydride, 20 parts by weight SEPS copolymer, and 35 parts by weight synthetic oil. The catalyst mixture, silicon hydride, and SEPS copolymer were similar to those employed in the previous samples. The synthetic oil was obtained under the tradename INDOPOL™ H100.

TABLE IV

| | AES# | |
|---|---|---|
| | 3163 | 3165 |
| | Samples | |
| | 20 | 21 |
| Polypropylene | 30 | 0 |
| Thermoplastic Polyurethane II | — | 35 |
| Maleated Polypropylene | — | 15 |
| Properties | | |
| Shore A Hardness | 60 | 43.5 |
| Ultimate Tensile Strength (psi) | 454 | 226 |
| Ultimate Elongation | 329 | 283 |
| Modulus @100 (psi) | 242 | 137 |
| LCR | 97 | — |
| Compression Set, 22 hr @ 23° C. | 28.3 | 19.6 |
| Moisture Vapor Transmission, (g/m * m * day) | 0.56 | 1.4 |
| Oxygen Permeability (cc/m * m * day) | 424 | 504 |
| Core Test (cores/100) | 7 | 2 |
| JP Pharma. Testing | | |
| Foaming visual | Pass | Pass |
| UV-22 | 0.049 | 0.003 |
| UV-23 @ 430 nm | 99.7 | 99.9 |

TABLE III

| | AES# | | | | | | | | | |
|---|---|---|---|---|---|---|---|---|---|---|
| | 336-1 | 336-2 | 336-3 | 336-4 | 336-5 | 336-6 | 336-7 | 336-8 | 336-9 | 336-10 |
| | Sample | | | | | | | | | |
| | 10 | 11 | 12 | 13 | 14 | 15 | 16 | 17 | 18 | 19 |
| Polypropylene | — | — | — | — | — | — | 20 | 20 | — | — |
| Thermoplastic Polyurethane I | — | 40 | — | 60 | — | 80 | — | 40 | — | — |
| Thermoplastic Polyurethane II | 40 | — | 60 | — | 80 | — | 40 | — | 40 | — |
| Thermoplastic Polyurethane III | — | — | — | — | — | — | — | — | — | 60 |
| | — | — | — | — | — | — | — | — | 20 | — |
| Properties | | | | | | | | | | |
| Shore A Hardness | 38 | 34 | 49.5 | 47 | 51.5 | 57 | 59 | 59 | 51 | 63 |
| Ultimate Tensile Strength (psi) | 250 | 352 | 623 | 637 | 362 | 520 | 800 | 827 | 396 | 796 |
| Modulus @100 (psi) | 115 | 181 | 190 | 228 | 158 | 205 | 223 | 252 | 284 | 188 |
| Elongation @ Break (%) | 200 | 225 | 359 | 316 | 291 | 357 | 421 | 418 | 216 | 577 |
| Tension Set (%) | Broke | 6 | 8 | 8 | Broke | 14 | 8 | 9 | 8 | 9 |
| Compression Set @ 22 hr., 100° C. | 42.6 | 21.5 | 53.6 | 54.5 | 81.3 | 55.8 | 62.2 | 61.6 | 60.6 | 61.8 |

TABLE IV-continued

| | AES# | |
|---|---|---|
| | 3163 | 3165 |
| | Samples | |
| | 20 | 21 |
| UV-23 @ 650 nm | 100 | 99.9 |
| Titrate 11 | 1.1 | 1.2 |
| pH 14 | −0.1 | −0.4 |
| Total Solids | 0.5 | 0.2 |

The Moisture Vapor Transmission test was performed according to ASTM F1249, and the Oxygen Permeability Test was performed according to ASTM D-1434. The Japan Pharmacopoeia Testing which analyzes the degree of migration from the thermoplastic vulcanizate.

The data in Table IV demonstrates that thermoplastic vulcanizates prepared according to the present invention (i.e., Sample 21) exhibit superior coring and mechanical properties over those thermoplastic vulcanizates prepared using polypropylene while the oxygen permeability and migration of constituents from the thermoplastic vulcanizate are comparable to those of polypropylene.

Various modifications and alterations that do not depart from the scope and spirit of this invention will become apparent to those skilled in the art. This invention is not to be duly limited to the illustrative embodiments set forth herein.

What is claimed is:

1. An article for sealing the contents of a container, the article comprising:
   a member adapted for sealing the container, where the member comprises:
   a thermoplastic vulcanizate comprising:
   (i) a dynamically cured brominated butyl rubber dispersed within a continuous phase consisting essentially of a polyester-based or polyether-based thermoplastic polyurethane having a glass transition temperature of less than 60° C.,
   (ii) from about 30 to about 40 parts by weight, per 100 parts by weight butyl rubber, of a synthetic oil selected from the group consisting of polyisobutylene, poly(isobutylene-co-butene), polybutadiene, and poly(butadiene-co-butene), and
   (iii) from about 5 to about 30 parts by weight, per 100 parts by weight of rubber, of carbon black, clay, or combination thereof, wherein: the thermoplastic vulcanizate includes:
   from about 20 to about 50 percent by weight thermoplastic polyurethane resin based on the weight of the butyl rubber component and thermoplastic polyurethane component combined, and
   wherein:
   the dynamically vulcanized butyl rubber is cured to an extent that not more than 5 weight percent of the rubber is extractable by cyclohexane at 23° C.,
   the thermoplastic vulcanizate is characterized by:
   an LCR viscosity of less than 150 Pa@1,200 s$^{-1}$,
   an ACR viscosity of less than 4000 poise,
   an oxygen permeability of less than 500 cc/m·m·day,
   a compression set of less than 30%, and
   a coreability characterized by less than 5 cores per 100 punctures, and the thermoplastic vulcanizate includes less than 1% by weight mineral oils, and the thermoplastic vulcanizate is substantially devoid of a compatibilizer.

2. The article of claim 1, where the member includes a generally cylindrical body.

3. The article of claim 1, where the member includes at least two distinct layers, where at least one layer includes the thermoplastic vulcanizate.

4. The article of claim 1, where the member includes a planar sheet.

5. The article of claim 1, where the thermoplastic vulcanizate includes from about 25 to about 90% by weight butyl rubber based upon the total weight of the butyl rubber and thermoplastic polyurethane combined.

6. The article of claim 5, where the thermoplastic vulcanizate further comprises from about 10 to about 15 parts by weight functionalized polyolefin per 100 parts by weight butyl rubber.

7. The article of claim 1, where the thermoplastic vulcanizate is devoid of mineral oils.

8. The article of claim 1, where the synthetic oil is an oligomer of one or more butene monomers.

9. The article of claim 1, where the synthetic oil is characterized by a viscosity in excess of about 20 cp as measured by a Brookfield viscometer according to ASTM D-4402 at 38° C.

10. The article of claim 1, where the butyl rubber includes one or more parabromomethylstyrenyl mer units.

11. The article of claim 1, where the dynamically cured butyl rubber is dispersed as fine particles within the thermoplastic polyurethane continuous phase.

12. A container in combination with the article of claim 1, where the article seals the container.

* * * * *